Patented Dec. 5, 1950

UNITED STATES PATENT OFFICE 2,532,668

PURIFICATION OF BRANCHED CHAIN PARAFFINS

Alfred E. Hirschler, Drexel Hill, Pa., assignor to Sun Oil Company, Philadelphia, Pa., a corporation of New Jersey No Drawing. Application May 27, 1946, Serial No. 672,686

3 Claims. (Cl. 260—676)

This invention relates to the separation of hydrocarbons and is particularly directed to a method of preparing a branched chain paraffin hydrocarbon of relatively high purity from a mixture comprising the same together with one or more naphthene hydrocarbons.

In the preparation of individual hydrocarbons by organic synthesis, it is seldom that the desired hydrocarbon may be produced directly in a high state of purity. Generally a mixture of hydrocarbons is formed, which includes compounds which may boil relatively close to the desired hydrocarbon. A usual procedure of purification involves distillation under fractionating conditions whereby removal of compounds having boiling points sufficiently different from that of the desired hydrocarbon may be accomplished. It is often the case, however, that a high degree of purity may not be attained in this manner, or may be obtained only with great difficulty, due to the proximity of boiling points of the various compounds. Likewise, in the separation of a particular hydrocarbon from a complex hydrocarbon mixture such as petroleum or coal tar fractions, it is often extremely difficult to segregate the desired component as a product of high purity due to the presence of other compounds of close boiling points. While the use along with straight distillation of other procedures, such as solvent extraction and azeotropic distillation, has resulted in improved separations in certain cases, generally speaking it has not been practical heretofore to produce hydrocarbons of high purity from mixtures containing closely related hydrocarbons. Usually the best that has been done from a practical aspect is to prepare hydrocarbons of technical purity, such as in concentrations in the order of 80% to 95%. To produce hydrocarbons in a high state of purity, for example, in concentrations better than 95%, from mixtures containing close boiling compounds heretofore has been extremely difficult and, in many cases, practically impossible.

The present invention provides an improved method whereby relatively pure branched chain paraffin hydrocarbons may be prepared from a starting material comprising the desired paraffin hydrocarbon, preferably in predominant amount, together with one or more naphthene hydrocarbons. The method is particularly useful where the components in the starting mixture boil closely together, as where they have the same number of, or differ by not more than one or two, carbon atoms per molecule. The purification is accomplished according to the invention by selective adsorption of the naphthene from the branched chain paraffin, utilizing activated carbon as the adsorbent.

The removal of a naphthene from a branched chain paraffin hydrocarbon by selective adsorption of the paraffin on activated carbon, so as to obtain the paraffin in a relatively high state of purity, does not appear to have been accomplished heretofore. I have found that activated carbon is capable of removing the naphthenic component from some mixtures of this type regardless of the concentration of the paraffin in the mixture. This is particularly true where the paraffin has a very highly branched chain. For example, 2,2,4-trimethylpentane-methylcyclohexane and 2,2-dimethylbutane-cyclohexane are mixtures from which activated carbon will selectively remove the naphthene substantially regardless of the proportion of naphthene in the mixture.

I have further found that there are many other branched chain paraffin-naphthene mixtures from which activated carbon will not selectively adsorb the naphthene when present in large proportion but will, however, selectively remove the naphthene when its proportion is not too great in the mixture. Paraffins which are not so highly branched chain tend to form this type of mixture. When the behavior is of this type, the paraffin may be purified by starting with a mixture containing the naphthenic component in a proportion substantially less than that at which the paraffin is selectively adsorbable, for example, a mixture composed of more than 80% of the paraffin together with only a small amount of the naphthene, and then treating such mixture with activated carbon. The smaller the amount of the naphthene the more easily its removal may be effected. This is in contrast to other separation methods such as distillation or solvent extraction wherein the separation becomes more difficult as the amount of a component decreases.

With paraffin-naphthene mixtures in which the paraffin is a straight chain compound, activated carbon is incapable of selectively adsorbing the naphthene even when it is present in low concentration. The treatment of such mixtures to purify the paraffin therefore does not fall within the scope of the present invention.

In practicing the invention a charge material is selected which contains the naphthenic component in a proportion at which it is selectively adsorbable. The charge should contain a large amount of the desired branched chain paraffin and only a small amount (say 20% or less) of the naphthene as impurity. This mixture is then treated with activated carbon to selectively adsorb the naphthene. In order to effect a high degree of separation, this treatment is carried out preferably by percolating the charge through a column of the adsorbent while employing a large proportion of the adsorbent. After all of the charge has passed into the adsorbent, it may be followed by a desorbing agent comprising a material more strongly adsorbable by activated carbon than the adsorbate in order to effect displacement of the charge material from the adsorbent. Examples of suitable desorbing agents are benzene, toluene, xylene, phenol or other aryl compounds. A relatively low boiling aliphatic hydrocarbon such as butane or pentane also may be employed as the desorbing agent, particularly when the charge material is sufficiently high boiling to be readily separable therefrom by distillation. A desorbing agent is not required, however, if sufficient charge is used to wet all of the adsorbent and produce a filtrate. The first portion of efflux or filtrate from the column will comprise the branched chain paraffin in a relatively high state of purity as compared to the charge. Succeeding portions will decrease in purity and, as the adsorbate is displaced from the gel, the filtrate will become less pure than the charge. The filtrate from the column may be cut into fractions as desired in order to segregate the portion containing the paraffin in the purity desired.

The following examples, in which percentages are by volume, will serve to illustrate more specifically how the invention may be practiced:

Example I

A column having an internal diameter of about ½ inch and a height of 3 feet was packed with 50 grams of 60–90 mesh activated carbon. The column was provided with a water jacket through which water was continuously circulated at a temperature of about 45–50° F. to absorb heat generated due to wetting of the adsorbent. Forty-nine milliliters of a starting mixture consisting of 89.5% 2,2,3-trimethylbutane and 11.5% cyclohexane were percolated down through the column. After all of the charge had passed into the adsorbent, it was followed by benzene to displace the charge material from the column. The filtrate was collected in fractions and the composition of each fraction was determined. Results were as follows:

| Cut No. | Fraction of Charge | Content of 2,2,3-trimethylbutane |
|---|---|---|
| | Per cent | Per cent |
| 1 | 0–6 | 99.5 |
| 2 | 6–18 | 95 |
| 3 | 18–35 | 92 |

It may be seen that the cyclohexane was selectively removed, resulting in a substantial purification of the 2,2,3-trimethylbutane. Still further purification could have been effected by retreating the cuts with activated carbon.

Example II

In this example a mixture consisting of 90% 2,2-dimethylbutane and 10% cyclohexane was treated in the same manner as described in Example I in order to purify the paraffin component. The following results were obtained:

| Cut No. | Fraction of Charge | Content of 2,2-dimethylbutane |
|---|---|---|
| | Per Cent | Per Cent |
| 1 | 0–4 | 100 |
| 2 | 4–12 | 97.5 |
| 3 | 12–22 | 94.5 |

These results show that extremely pure 2,2-dimethylbutane may be made from the starting mixture according to the present method.

Example III

This run was carried out in the same manner as in Example I with a starting mixture consisting of 90% 2,2,4-trimethylpentane and 10% methylcyclohexane. Results were as follows:

| Cut No. | Fraction of Charge | Content of 2,2,4-trimethylpentane |
|---|---|---|
| | Per cent | Per cent |
| 1 | 0–8 | 99 |
| 2 | 8–20 | 95 |
| 3 | 20–61 | 92.5 |

In practicing the invention it generally will be desirable to reactivate the adsorbent after it has been used in order that it may be used again. This may be done by blowing the adsorbent with hot inert gas or air to drive off the adsorbed hydrocarbons or to drive off the desorbing agent if one has been used.

The temperature at which the adsorption operation is carried out may affect the efficiency of the separation and it often will be the case that a poorer separation will be obtained at elevated temperature. The operation therefore is preferably conducted at room temperature or below to insure a better separation. This generally will necessitate the provision of some means for removing any heat generated due to wetting of the adsorbent as, for instance, by providing means for circulating a cooling medium around the adsorbent column.

Various modifications of the herein described process are permissible within the broad aspects of the invention and will be apparent to those skilled in the art.

Having described my invention, what I claim and desire to protect by Letters Patent is:

1. A process for purifying a branched chain paraffin hydrocarbon from a liquid mixture composed of more than 80% of said paraffin hydrocarbon together with a small amount of a naphthene hydrocarbon as impurity which comprises filtering the mixture through a body of activated carbon, thereby selectively adsorbing said naphthene, and separating from the activated carbon a filtrate fraction containing said branched chain paraffin hydrocarbon in more nearly pure form.

2. Process according to claim 1 wherein the said hydrocarbons differ by not more than two carbon atoms per molecule.

3. Process according to claim 1 wherein the said hydrocarbons have the same number of carbon atoms per molecule.

ALFRED E. HIRSCHLER.

REFERENCES CITED

The following references are of record in the file of this patent:

UNITED STATES PATENTS

| Number | Name | Date |
|---|---|---|
| 2,306,610 | Barrer | Dec. 29, 1942 |
| 2,415,315 | Walter et al. | Feb. 4, 1947 |
| 2,425,535 | Hibshman | Aug. 12, 1947 |

OTHER REFERENCES

Mair et al., Jour. Res. Nat. Bur. of Stand., vol. 32, 165–183 (1944).

Mair et al., The Oil and Gas Journal, September 19, 1935, pages 29, 30 and 32.